Aug. 21, 1962  H. M. FOX ETAL  3,050,435
METHOD OF CONSOLIDATING SOLID ROCKET PROPELLANT GRAINS
Filed Oct. 24, 1957  4 Sheets-Sheet 3

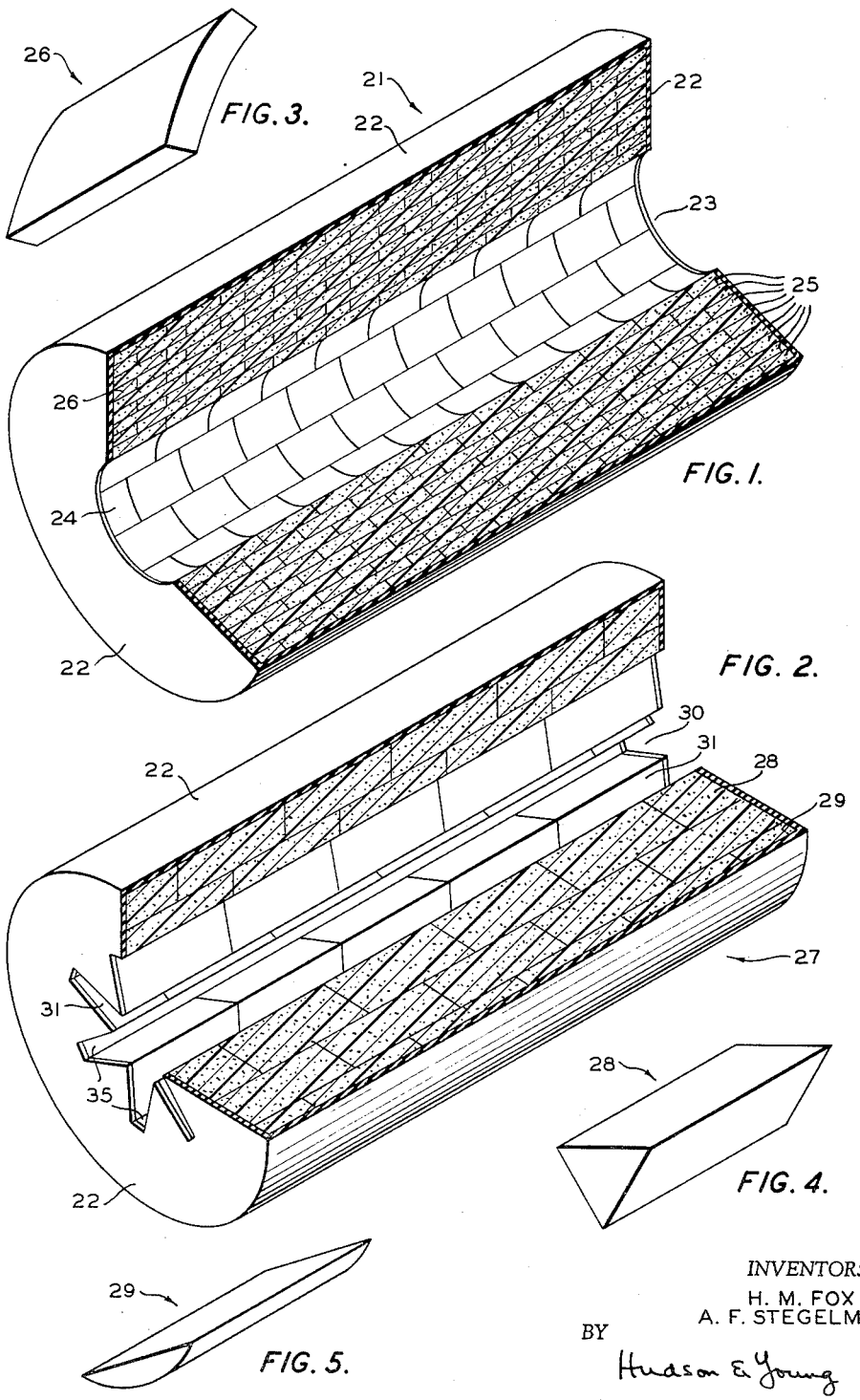

INVENTORS
H. M. FOX
A. F. STEGELMAN
BY Hudson & Young
ATTORNEYS.

Aug. 21, 1962     H. M. FOX ETAL     3,050,435
METHOD OF CONSOLIDATING SOLID ROCKET PROPELLANT GRAINS
Filed Oct. 24, 1957     4 Sheets-Sheet 4
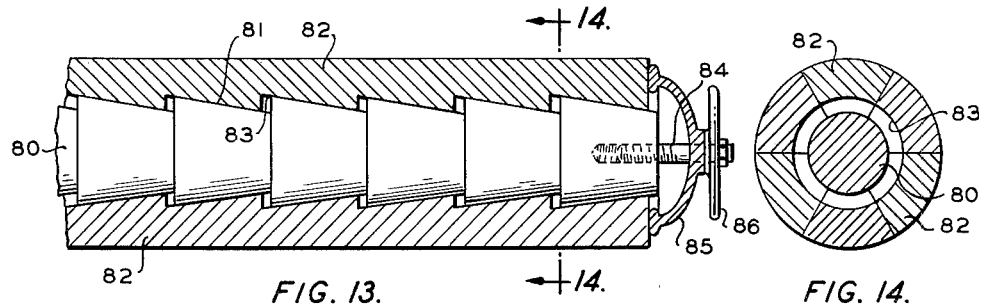
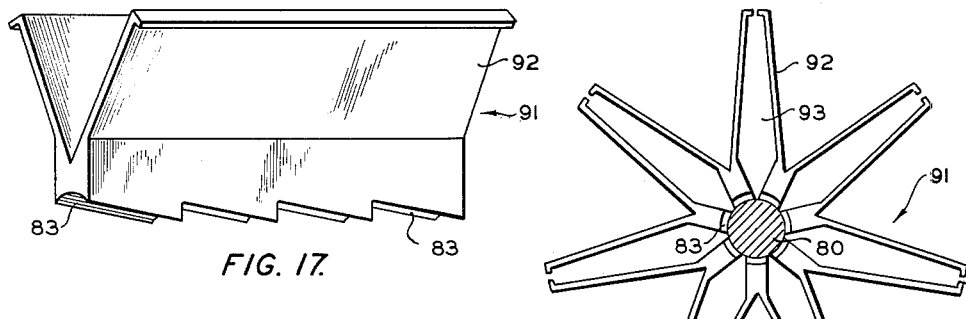
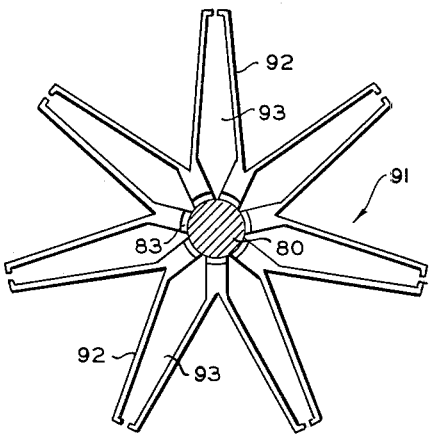
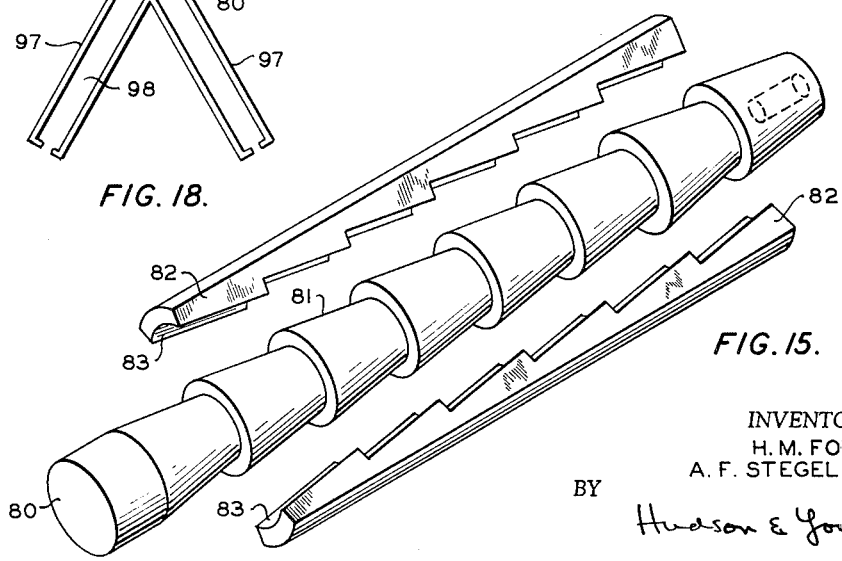
INVENTORS
H. M. FOX
A. F. STEGELMAN
BY Hudson & Young
ATTORNEYS.

United States Patent Office 3,050,435
Patented Aug. 21, 1962

3,050,435
METHOD OF CONSOLIDATING SOLID ROCKET PROPELLANT GRAINS
Homer M. Fox and Albert F. Stegelman, Bartlesville, Okla., assignors to Phillips Petroleum Company, a corporation of Delaware
Filed Oct. 24, 1957, Ser. No. 692,236
6 Claims. (Cl. 156—294)

This invention relates to solid rocket propellant charges. In one aspect it relates to consolidating a solid rocket propellant charge comprising a module grain. In another aspect it relates to method and means for consolidating such charges made from solid rocket propellant, such as propellant of the composite type, said charge having a relatively long burning duration, enormous weight, and especially adapted for use in a sustained-thrust rocket motor having a relatively high total impulse.

Rocket motors utilizing solid p ropellant may be classified in several categories depending on their size, shape and/or configuration of the charge, and on their utility (e.g., jet-assisted-take-off, booster, sustainer, or missile). Each classification has specific problems relating to its requirements and specifications. The present invention generally relates to those rocket motors utilizing large sustainer propellant charges having relatively long burning durations and capable of imparting high total impulses.

Rocket motors utilizing solid propellant may be classisustainer propellant charges which involve scale-up problems of fabrication and assembly not found in the prior art. Since large sustainer propellant charges may weigh as much as 6,000 pounds or more, hazards in fabricating and handling such large masses of propellant material are encountered. It is generally not feasible to extrude, mold or cast a cylindrical grain of propellant material having such great weight.

Recently it has been discovered that large sustainer propellant charges can be fabricated from a plurality of bricks or blocks of solid propellant of the composite type, the blocks being built up to form a large module grain. However, in fabricating such composite module grains there has arisen a need for a suitable method and means for consolidating the module grain to effect a positive and reliable bond between contiguous surfaces of the blocks of propellant. It is very important that this bond remain effective since the total charge may weight up to 6,000 pounds or more and will be subjected to enormous forces of inertia as well as mechanical and vibrational shocks during handling and operation. Moreover, this bond must be reliable through a wide range of temperatures since acceptance by military agencies requires that the module grain retain its desirable physical properties when subjected to variable temperature cycles, for example, between —75° F. and 170° F. Such temperature cycling causes temperature-induced stresses and strains to occur in the propellant mass, which forces tend to cause cracking, breaking, and fragmentation of the propellant material.

Accordingly an object of this invention is to provide a consolidated solid rocket propellant module grain. Another object is to provide a method for consolidating solid rocket propellant module grains. Another object is to provide a method and means for consolidating module grains made from solid propellant of the composite type. Another object is to effect a reliable and positive bond between contiguous surfaces of a plurality of blocks of solid rocket propellant, which bond will remain effective despite subjection of the charge to severe inertial forces, mechanical and vibrational shocks, and temperature-induced forces encountered during storage, handling, or firing. Further objects and advantages of this invention will become apparent from the following discussion, appended claims, and accompanying drawings, in which:

FIGURE 1 is an isometric view of a large, sustainer module grain, in partial section, having an axial perforation which is circular in cross-section;

FIGURE 2 is an isometric view of a large, sustainer module grain, in partial section; having axial perforation which is star-shaped in cross-section;

FIGURE 3 is an isometric view of one of the individual blocks of propellant which make up the module grain illustrated in FIGURE 1;

FIGURES 4 and 5 are isometric views of individual blocks of propellant which make up the module grain illustrated in FIGURE 2;

Figure 6:
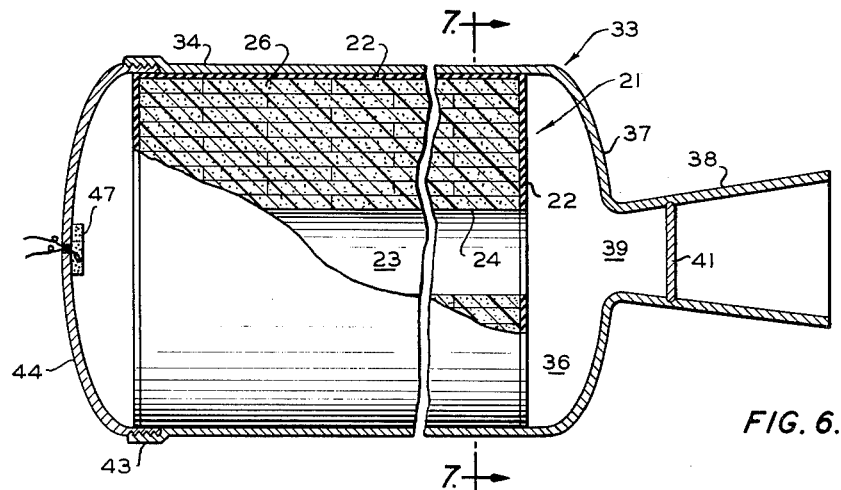
FIGURE 6 is an elevational view, in longitudinal cross-section, of a rocket motor of the sustainer type loaded with a sustainer module grain such as that module grain illustrated in FIGURE 1.

FIGURES 13, 14 and 15 illustrate in various views the elements of another type consolidating equipment; and FIGURES 16, 17 and 18 illustrate views of modified elements illustrated in FIGURES 13, 14 and 15.

FIGURES 16, 17 and 18 illustrate views of modified elements illustrated in FIGURES 13, 14 and 15.

Broadly contemplated, this invention provides a method and means for consolidating module grains or charges made from blocks of solid propellant, preferably of the composite type, whereby a radial force or pressure is applied to the mass of propellant making up the grain so as to effect a rugged, reliable, and positive bond between contiguous surfaces of the individual blocks of propellant material making up the grain. Prior to the consolidating step, the individual blocks of propellant may be uncured or cured and the bond can be effected with the use of a suitable adhesive or propellant mortar, or alternatively, the bond can be effected between uncured blocks of propellant without the use of an adhesive. The individual blocks of propellant can have various sizes and shapes and these blocks of propellant are assembled to form a module grain having a generally cylindrical shape with an axial perforation, defined by an exposed burning surface, which may be circular or star-shaped in cross-section, or any other desirable shaped in cross-section. During the consolidating step, while the radial force or pressure is applied to the mass of propellant, the module grain is subjected to elevated temperatures which cure the uncured blocks of propellant and/or uncured adhesive or propellant mortar. The radial force or pressure can be applied with various types of consolidating equipment, such as rotating equipment adapted to impart centrifugal force to the mass of propellant, and expandable mandrel positioned with the axial perforation, or an expandable bag positioned within the axial perforation. The force is applied for a sufficient length of time, e.g., 1 to 24 hours, so as to effect a positive bond between contiguous surfaces of the blocks of propellant.

A fuller understanding of our invention will be gained by reference to the accompanying drawing and the following discussion.

Referring now to FIGURE 1, a large cylindrical module grain generally designated 21 is shown, the outer cylindrical surface and ends of which can be covered with suitable burning-restricting material 22. Grain 21 has an axial perforation 23 which extends the length of the grain and is circular in cross-section. Perforation 23 is defined by internal burning surface 24 comprising exposed surface of propellant. Grain 21 is made up from a plurality on contiguous concentric strata 25 of propellant, each stratum made up in turn from a plurality of contiguous individual blocks 26 of propellant, such as illustrated in FIGURE 3, having a generally concave-convex cross-section.

In FIGURE 2, sustainer module grain 27 is similar to that of FIGURE 1 in that it also has its outer cylindrical surfaces and ends covered by burning-restricting material 22. Grain 27 is made up from a plurality of contiguous individual blocks of propellant, such as wedge-shaped blocks 28, and plane-convex blocks 29, more clearly shown in FIGURES 4 and 5. Grain 27 has an axial perforation 30 which is star-shaped in cross-section and which is defined by the exposed surfaces 31 of the intermost stratum of propellant.

Figure 7:
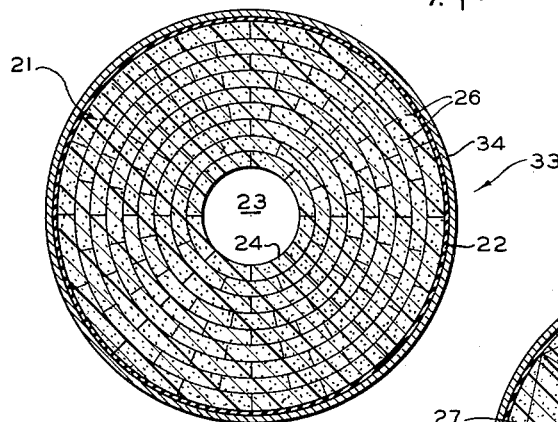
FIGURE 7 is an elevational cross-sectional view of FIGURE 6 taken along the plane indicated.

In FIGURES 6 and 7, a rocket motor generally designated 33 is shown having a shell or cylindrical casing 34 defining in part a combustion chamber 36. The rear or aft end of casing 34 is reduced at 37 and flared to form a nozzle portion 38; these members are so constructed as to define a conversing-diverging passage 39 for the exhaust of gaseous products from combustion chamber 36. Alternatively, the nozzle portion 38 may be made separable from the reduced casing portion 37 instead of the integral nozzle portion shown. A blowout or starter disc 41 can be positioned across passage 39 with its periphery fitted in an annular notch in nozzle portion 38. Reduced casing portion 37 can also be fitted with one or more safety plug attachments capable of releasing excessive pressure from the combustion chamber 36 in a manner well known to those skilled in the art. The fore or head portion of casing 34 is preferably constructed in the form of a flange 43 and is secured to the head or closure member 44 by welding, threads, or the like after the combustion chamber 36 has been loaded with its module grain.

The combustion chamber 36 of rocket motor 33 is loaded with a large, sustainer-type module grain, such as grain 21 of FIGURE 1. Grain 21 can be bonded on its outer cylindrical surface to rocket motor casing 34 by any suitable means, such as with a suitable adhesive rubbery restricting material, which can be cured along with the propellant. An igniter 47 is preferably attached to the inside of closure member 44 and disposed in axial alignment with perforation 23. Igniter 47 can be any of the igniters commonly employed in the rocket art; for example, black powder or other suitable pyrotechnic material contained in the suitable wire mesh container or plastic bag or the like with suitable electro-responsive means such as squibs or matches therein. Igniter 47 can be fired by the closing of a suitable switch in an electric circuit which leads to a power source external the rocket motor 33 and supplies electrical energy to the electro-responsive means thereby causing the initiation of burning of the igniter material, the resulting decomposition products thereby contacting the exposed burning surface 24 of the grain 21 transferring heat thereto and causing the burning of the propellant material.

Although grain 21 is illustrated having nine contiguous concentric strata of propellant, any number of strata can be employed. Moreover, the number of individual blocks 26 of propellant in any stratum can be varied in a manner other than that shown in the drawing. Where an adhesive is employed to bond the contiguous blocks 26 and strata 25 together, it is applied during the assembly of the charge in any suitable manner. This adhesive can also be used to bond the restrictor material 22 to the exterior surface of the grain and to bond the outer cylindrical surface of the restrictor material to the casing 34.

Figure 8:
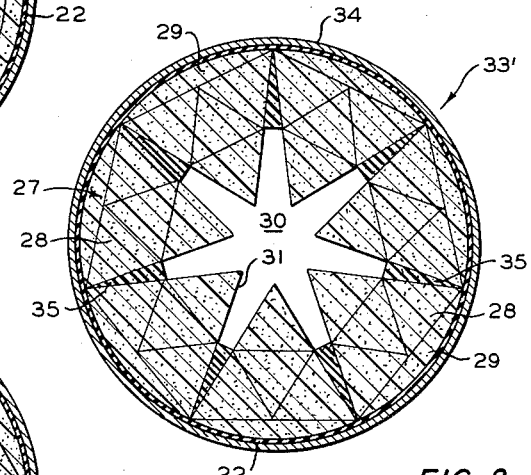
FIGURE 8 is a cross-sectional view similar to that of FIGURE 7 illustrating another embodiment of a rocket motor loaded with a sustainer module grain of this invention such as that illustrated in FIGURE 2.
Figure 9:
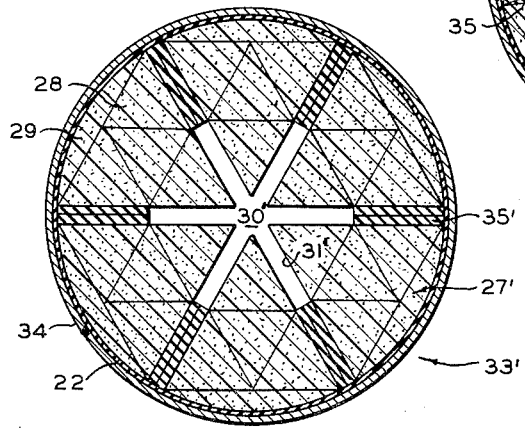
FIGURE 9 is a cross-sectional view similar to that of FIGURE 8 illustrating another embodiment of a rocket motor loaded with a sustainer module grain of this invention.

In FIGURE 8, a rocket motor 33' is shown in transverse section loaded with the grain 27 of FIGURE 2. Here again, an adhesive can be used to bond contiguous surfaces of blocks 28, 29 together, with the outer cylindrical surface of the grain bonded to the restricting material 22, the latter being in turn bonded to the inner wall of casing 34. Restricting material 35 can be inserted between some of the blocks 28 in radial alignment with the tapered star points of perforation 30. Adhesive can be used to bond restricting material 35 to adjacent blocks 28. The transverse sectional view of FIGURE 9 shows a rocket motor 33' loaded with a grain 27', similar to that of FIGURE 2, with a star-shaped perforation 30' having star points with a constant cross-sectional area and restricting material 35' in radial alignment with the star points. The blocks 28, 29 can also be bonded together with a suitable adhesive in the manner described above.

Although we have described and illustrated a rocket motor loaded with a single, large module grain, it is within the scope of this invention to provide a rocket motor utilizing a plurality of such grains, aligned for example in a tandem manner within the combustion of a rocket motor.

Reference will now be made to the method and means for consolidating the module grains hereinbefore described.

Figure 10:
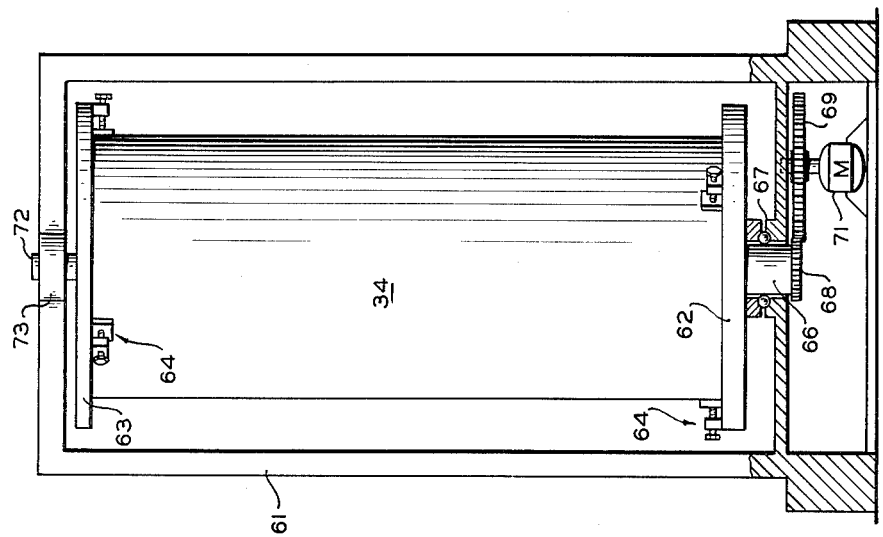
FIGURE 10 is an elevational view, in partial section, of one type of consolidating equipment.

In FIGURE 10, an assembled module grain, such as grain 21 of FIGURE 1, is supported within a rocket motor casing 34 which is positioned within the frame 61 of suitable centrifugal equipment. Grain loaded casing 34 rests on a rotatable table 62 and is surmounted by an upper table 63. Casing 34 is secured and aligned within frame 61 between plates 62, 63 by suitable clamps 64 or the like. Rotatable table 62 has a lower axle 66 which depends within a suitable thrust bearing 67. The lower end of axle 66 is secured to suitable gear means 68 adapted to mesh with gear means 69 driven by a suitable power source such as motor 71. The upper table or plate 63 is similarly provided with an axle 72 which is enclosed within bearing 73 in the upper end of frame 61. In operation, rotation of rotatable table 22 causes casing 34 to rotate therewith and in rotation, centrifugal force is imparted to module grain within the casing so as to exert a radial force or pressure on the mass of propellant. During rotation, the grain is subjected to elevated temperatures for the purpose of curing uncured blocks of propellant and/or the uncured adhesive or propellant mortar bonding contiguous surface of the blocks of propellant. Any restricting material employed can also be cured at this time.

Figure 11:
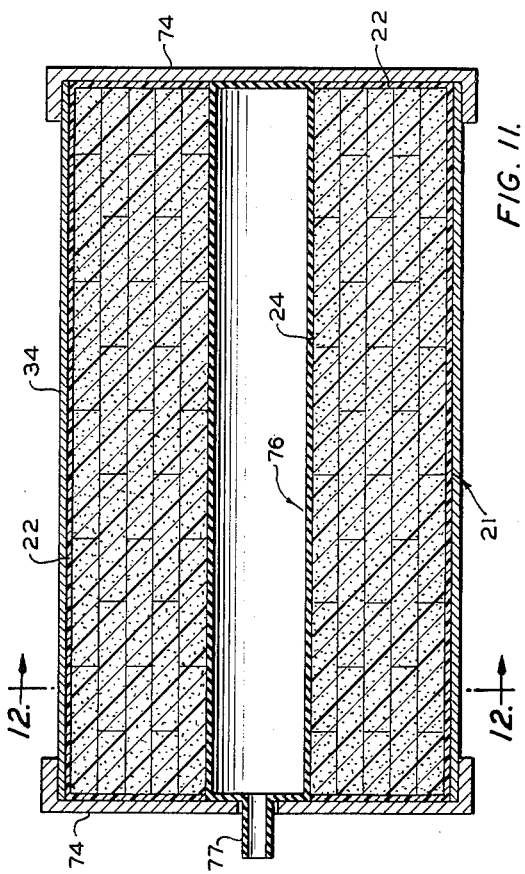
FIGURES 11 and 12 are cross-sectional views illustrating another type of consolidating equipment.
Figure 12:
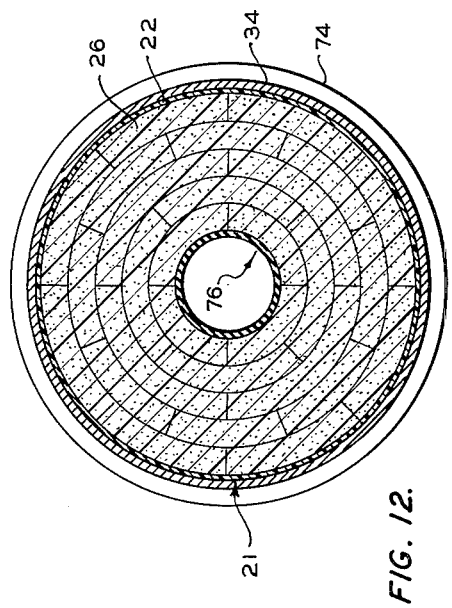

Referring now to FIGURES 11 and 12, a sustainer module grain, such as grain 21 illustrated in FIGURE 1, is loaded with a rocket motor casing, such as 34 of FIGURE 6. A temporary end piece 74 fits over both ends of the rocket motor casing 34. A suitable expandable bag 76, made of rubber, plastic or the like which will withstand propellant curing temperatures, is disposed within the perforation 23 of the grain 21 and has attached to one end a suitable inlet nozzle 77 which protrudes through an opening in one of the end plates 74. In operation, a suitable gas, such as compressed air, is injected into the initially collapsed bag 76 causing the latter to expand into contact with the exposed burning surface 24 of grain 21. While the propellant mass is under the radial force or pressure exerted by the expanded bag 76, the module grain is subjected to elevated temperatures for sufficient length of time to cure the uncured blocks of propellant and/or the uncured adhesive so as to effect a positive bond between contiguous surfaces of blocks of propellant. Where grains having star-shaped perforations are cured in this manner, the expandable bag can be adapted to enlarge or expand in the star points as well as in the central portion of the perforation.

In FIGURES 13, 14 and 15 another type of consolidating equipment is shown, which can be generally referred to as expandable mandrel means. The latter comprises a solid core 80 provided with multiple frustoconical surfaces 81. In sliding contact with the frustoconical surfaces 81 is an outer circumferentially segmented cylinder 82, the inner surfaces 83 of which are in sliding contact with the outer surfaces 81 of core 80. Attached to one end of core 80 is a suitable screw 84 which protrudes from one end to the core and threadedly engages a pressure ring 85 which is secured to one end of the cylinder segments 82. Threadedly engaging the end of screw 84 is a wheel 86 which upon rotation causes movement of core 80 within cylinder 82. The mandrel means is adapted for insertion within the axial perforation of the grain, such as perforation 23 of grain 21 illustrated in FIGURE 1. In operation, with the mandrel means so inserted, wheel 86 is rotated so as to cause the cylinder segments 82 to expand and move outwardly in contact with the exposed burning surface 24 of the grain 21 of FIGURE 1. As such, a radial force or pressure is applied to the module grain 21 and this force or pressure is applied while subjecting the grain to elevating temperatures so as to cure the uncured blocks of propellant and/or the uncured propellant mortar so as to effect a reliable bond between contiguous surfaces between the blocks of propellant.

In FIGURES 16 and 17 an alternative expandable circumferentially segmented means 91 is illustrated, the latter comprising a plurality of V-shaped members 92, with a tapered space 93 there between, adapted to be expanded, similar to segments 82 of FIGURE 13, into contact with the exposed burning surfaces of a module grain such as that illustrated in FIGURE 2 having a star-shaped perforation with tapered star points.

In FIGURE 18, another embodiment of the expandable circumferentially segmented means 96 is illustrated, the V-shaped members 97, with spaces 98 of constant width there between, similarly adapted to contact the star points of a sustainer grain having an axial perforation in the shape of a star, such as that illustrated in FIGURE 9.

Both of the V-shaped members in FIGURES 16 and 18 can be fitted with a pressure ring and wheel like that of FIGURE 13.

In preparing the module grains of this invention, we prefer to employ solid propellant mixtures of the composite-type comprising a major proportion of a solid oxidant, such as ammonium nitrate and preferably ammonium perchlorate, and mixtures thereof, and a minor proportion of a rubbery binder material, such as a copolymer of a conjugated diene and a vinylpyridine or other substituted heterocyclic nitrogen base compound. Solid propellant mixtures of this nature and a process for their production are disclosed and claimed in the copending application Serial No. 284,447, filed April 25, 1952, by W. B. Reynolds and J. E. Pritchard.

Particularly useful propellant compositions which may be utilized in the practice of this invention are of the rubbery copolymer-oxidant type which are plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the propellant at temperatures preferably in the range of 170° to 250° F.

The copolymers employed as binders are preferably formed by copolymerization of a vinyl heterocyclic nitrogen compound with an open chain conjugated diene. The conjugated dienes employed are those containing 4 to 5 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methyl-vinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2 - methyl - 5 - vinylpyridine, hereinafter abbreviated Bd/MVP. This copolymer is polymerized to a Mooney (ML–4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, is added to the carbon black slurry or to the water used to prepare the slurry.

The following empirical formulation or recipe generally represents the class of propellant compositions preferred for the preparation of the propellant charge of this invention:

*Table I*

| Ingredient | Parts per 100 Parts of Rubber | Parts by Weight |
|---|---|---|
| Binder | | 10–25 |
|   Copolymer (Bd/MVP) | 100 | |
|   Philblack A (a carbon black) | 10–30 | |
|   Plasticizer | 10–30 | |
|   Silica | 0–20 | |
|   Metal oxide | 0–5 | |
|   Antioxidant | 0–5 | |
|   Wetting agent | 0–2 | |
|   Accelerator | 0–2 | |
|   Sulfur | 0–2 | |
| Oxidant (ammonium nitrate) | | 75–90 |
| Burning rate catalyst | | 0–15 |

Suitable plasticizers useful in preparing these propellant charges include TP–90B (dibutoxyethoxyethyl formal supplied by Thiokol Corp.); benzophenone; and Pentaryl A (monoamylbiphenyl). Suitable silica preparations include a 10–20 micron size range supplied by Davison Chemical Co.; and Hi-Sil 202, a rubber grade material supplied by Columbia-Southern Chemical Corp. A suitable anti-oxidant is Flexamine, a physical mixture containing 25 percent of a complex diarylamine-ketone reaction product and 35 percent of N,N'-diphenyl-p-phenylenediamine, supplied by Naugatuck Chemical Corp. A suitable wetting agent is Aerosol-OT (dioctyl sodium sulfosuccinate, supplied by American Cyanamid Co.). Satisfactory rubber cure accelerators include Philcure 113 (SA-113-N,N'-dimethyl-S-tertiary butylsulfenyl dithiocarbamate); butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides.

Suitable burning rate catalysts useful in fabricating our propellant charges include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, copper chromite, ammonium molybdate, and the like, can also be used. We prefer to employ Milori blue as the burning rate catalyst. By varying the catalyst content (e.g., between 0.025 and 1.5 weight percent) and the particle size of the oxidant (e.g., between the HB screen size of 0.035 and 0.125 inch) the burning rate of the propellant charge can be varied (e.g., between 0.10 and 0.20 inch per second at 1000 p.s.i.).

Where an adhesive is utilized for bonding the outer blocks of propellant to the rocket motor casing or restricting material and the various blocks to each other, the adhesive should preferably have a burning rate which is approximately the same as the average burning rate of the propellant charge. We prefer to use oxidizer-containing adhesives which will cure along with the propellant and which will burn at a fast enough rate so as not to impede the combustion of the propellant mass. One suitable adhesive that can be used comprises a compatible rubbery binder preferably liquid in its uncured state and having incorporated therein a low but sufficient oxidizer content. The usual rubber base cements are not particularly applicable since their burning rates are so slow that for all intents and purposes they are incombustible and they do not possess the desirable resiliency. A series of particularly useful rubbery binders which can be employed in the propellant mortar of the present invention are polysulfide liquid polymer formulations such as LP-2, LP-3, and LP-8, prepared by the Thiokol Corp. When these polymers have incorporated therein ammonium perchlorate, which contains a higher percentage of available oxygen than ammonium nitrate, low oxidizer loadings must be utilized to limit burning rate to the desirable range of 0.1 to 0.2 inch/sec. These formulations are characterized by their high resiliency due to the nature of the binder and to their relatively low oxidizer content; when the propellant strata are bonded with mortar made from these formulations the charge is less susceptible to the effects of shock and temperature induced forces. Suitable propellant mortar formulations for the preparation of resilient mortars having burning rates in the range of 0.1 to 0.2 inch per second are:

*Table II*

| Ingredient: | Weight percent |
|---|---|
| Ammonium perchlorate | 40–60 |
| LP-3 [1] | 35–55 |
| p-Quinone dioxime | 0–5 |
| Diphenyl quanidine | 0–3 |

[1] A liquid polysulfide polymer prepared by the Thiokol Corp.

It is to be understood, however, that uncured blocks of propellant can be consolidated without the use of an adhesive since the bond can be effected between contiguous surfaces of uncured propellant by applying the radial force during the curing step.

Various modifications and alterations of our invention will become apparent to those skilled in the art without departing from the scope and spirit of our invention, and it is to be understood that the foregoing discussion and drawing merely illustrates the preferred embodiments of our invention and do not unduly limit the same.

We claim:

1. A method for consolidating a cylindrical, module grain of solid propellant of the composite type comprising a major amount of an oxidizer and a minor amount of a rubbery binder, said grain being built up from a plurality of contiguous blocks of propellant assembled within a rocket motor casing, said grain having an axial perforation defined by an internal exposed surface of propellant which functions as an initial burning surface, which method comprises applying a radial force to said grain while subjecting said grain to elevated curing temperatures for a time sufficient to effect a positive bond between contiguous surfaces of said blocks of propellant.

2. A method for consolidating a cylindrical, module grain of uncured solid propellant of the composite type comprising about 75 to 90 parts by weight of an oxidizer and about 10 to 25 parts by weight of a rubbery binder, said grain being built up from a plurality of contiguous blocks of said propellant assembled within a rocket motor casing, said grain having an axial perforation defined by an internal exposed surface of said propellant which functions as an internal burning surface, which method comprises applying a radial force to said grain while subjecting said grain to elevated curing temperatures for a time sufficient to effect curing of said propellant and to effect a positive bond between contiguous surfaces of said blocks of propellant.

3. The method according to claim 2 wherein said radial force is applied by rotating said casing with said grain loaded therein.

4. The method according to claim 2 wherein said radial force is applied by expanding an expandable bag within said perforation into contact with said exposed surfaces.

5. The method according to claim 2 wherein said radial force is applied by expanding an expandable mandrel within said perforation into contact with said exposed surfaces.

6. The method according to claim 2 wherein said grain is assembled by applying an adhesive between contiguous surfaces of said blocks of propellant.

References Cited in the file of this patent

UNITED STATES PATENTS

| 835,296 | Bell | Nov. 6, 1906 |
| 2,407,806 | Arnold et al. | Sept. 17, 1946 |
| 2,417,090 | Silk et al. | Mar. 11, 1947 |
| 2,690,914 | Bryant et al. | Oct. 5, 1954 |
| 2,826,419 | Francis et al. | Mar. 11, 1958 |

OTHER REFERENCES

Zaehringer: Solid Propellant Rockets, 1955, pp. 79–83, American Rocket Co., Box 1112, Wyandotte, Mich.

Kirk & Othmer: Encyclopedia of Chemical Technology, 1953, vol. 11, pp. 937–942, Interscience Publishing Co., New York.